United States Patent
Boodaghians et al.

(10) Patent No.: US 9,902,497 B2
(45) Date of Patent: Feb. 27, 2018

(54) METHOD AND SYSTEM FOR MANAGING THE GREY WATER IN AN AIRCRAFT

(71) Applicant: MAG AEROSPACE INDUSTRIES LLC, Carson, CA (US)

(72) Inventors: Razmik Boodaghians, Glendale, CA (US); Kevin Huang, Hermosa Beach, CA (US); Christina Ortolan, Long Beach, CA (US)

(73) Assignee: MAG Aerospace Industries, LLC, Carson, CA (US)

( * ) Notice: Subject to any disclaimer, the term of this patent is extended or adjusted under 35 U.S.C. 154(b) by 0 days.

(21) Appl. No.: 15/113,023

(22) PCT Filed: Jan. 21, 2015

(86) PCT No.: PCT/IB2015/000054
§ 371 (c)(1),
(2) Date: Jul. 20, 2016

(87) PCT Pub. No.: WO2015/110898
PCT Pub. Date: Jul. 30, 2015

(65) Prior Publication Data
US 2017/0008629 A1  Jan. 12, 2017

Related U.S. Application Data

(63) Continuation-in-part of application No. 14/515,314, filed on Oct. 15, 2014, now abandoned.

(60) Provisional application No. 61/929,632, filed on Jan. 21, 2014.

(51) Int. Cl.
*A47K 4/00* (2006.01)
*B64D 11/02* (2006.01)
*F04B 43/04* (2006.01)
*E03D 5/00* (2006.01)
*E03B 1/04* (2006.01)

(52) U.S. Cl.
CPC .............. *B64D 11/02* (2013.01); *E03B 1/042* (2013.01); *E03D 5/003* (2013.01); *F04B 43/04* (2013.01); *E03B 2001/045* (2013.01)

(58) Field of Classification Search
CPC ....................................................... E03B 1/04
USPC ............................................................. 4/665
See application file for complete search history.

(56) References Cited

U.S. PATENT DOCUMENTS

| 3,567,032 A | 3/1971 | Kemper |
| 4,143,998 A | 3/1979 | O'Connor |
| 4,197,597 A | 4/1980 | Toms |
| 4,832,582 A | 5/1989 | Buffet |
| 5,147,532 A | 9/1992 | Leek, Jr. |

(Continued)

FOREIGN PATENT DOCUMENTS

| DE | 91 14 232.6 U1 | 4/1992 |
| WO | 2012/141515 A2 | 10/2012 |

*Primary Examiner* — Lori Baker
(74) *Attorney, Agent, or Firm* — Kilpatrick Townsend & Stockton LLP; Dean W. Russell; Kristin M. Crall (57) ABSTRACT

A method of removing wastewater contained in a water retention tank of a grey-water management system for an aircraft toilet. The method removes the wastewater via a diaphragm pump having an undulating diaphragm. The diaphragm pump includes an inlet pipe connected to the retention tank, the diaphragm of the pump is actuated by electromagnetic or magnetic actuation so as to remove wastewater present in the retention tank through the inlet pipe of the pump to an outlet pipe of the pump.

14 Claims, 5 Drawing Sheets

(56) References Cited

U.S. PATENT DOCUMENTS

| | | |
|---|---|---|
| 5,232,010 A | 8/1993 | Rozenblatt et al. |
| 5,305,792 A | 4/1994 | Ellgoth et al. |
| 6,568,926 B1 | 5/2003 | Mount |
| 7,293,967 B2 | 11/2007 | Fukano et al. |
| 7,997,295 B2 | 8/2011 | Brown et al. |
| 2009/0092505 A1 | 4/2009 | Cohoon et al. |
| 2012/0107155 A1 | 5/2012 | Fukano et al. |
| 2013/0305444 A1 | 11/2013 | Boodaghians et al. |

METHOD AND SYSTEM FOR MANAGING THE GREY WATER IN AN AIRCRAFT

BACKGROUND

Technical Field

The present invention relates to a method of removing wastewater contained in a water retention tank of a grey-water management system for an aircraft toilet, and it also relates to a grey-water management system for managing the grey water of an aircraft.

Description of the Related Art

In particular in the field of aviation, it is well known to use "vacuum" toilets to flush waste into a septic tank. The water used in such vacuum toilets generally comes from grey water in turn coming from the washbasins or from the galley of the aircraft, so as to limit the quantity of water taken on board, and, ultimately, so as to limit the weight of the aircraft. The "galley" of an aircraft is the special compartment from which the meals are served. The term "grey water" means wastewater that does not contain much pollutant matter, such as wastewater of domestic origin resulting from washing dishes or hands, in particular.

Thus, the grey-water management system usually includes a washbasin, a water supply faucet or tap for supplying water to said washbasin, a drain for draining wastewater from the washbasin, which drain is connected to a retention tank provided with a filter, and a bowl or pan supplied with water by a pump connected to the retention tank. The system generally also includes a main wastewater tank, the bowl and the retention tank being connected to said main tank via pipes that are respectively equipped with a valve and with a solenoid valve.

The pumps used in such grey-water management systems consist of "rotodynamic" pumps, such as, for example, centrifugal pumps and/or positive displacement pumps, powered by electrical energy or by hydraulic energy.

The rotodynamic pumps that are in most widespread use in grey-water management systems are centrifugal pumps or turbine pumps, such a pump including a pump body constituted mainly of a suction or inlet pipe, of a volute chamber or casing, and of a delivery or discharge pipe. The volute chamber receives the moving portion or rotor that is formed by an impeller, said impeller being in the form of a bladed wheel mounted on a shaft. The rotor is actuated by a drive machine that may be an electric motor, a hydraulic motor, an internal combustion engine, or a turbine.

That type of pump suffer from numerous drawbacks. Generally, that type of pump suffers from having poor energy efficiency, which lies approximately in the range 30% to 70%, from having a large overall volume and a large overall weight, from having considerable wear on the rotating parts, requiring frequent maintenance, and from being sensitive to the phenomenon of cavitation. Cavitation is a noisy phenomenon that can destroy a machine in a few minutes. During the pumping, the liquid situated inside a centrifugal pump does not have a uniform pressure. In particular, zones are present in it that have suction or negative pressure that is accentuated to various extents. When the pumped liquid is sufficiently close to its boiling point, i.e., to the point at which it goes from the liquid state to the gas state, it can happen that the pressure at those points falls below its vapor pressure, so that vapor bubbles are formed in the pump. When such bubbles reach the zones in which the pressure is going back up, they implode suddenly. The implosion is accompanied by noise, and, when it takes place in the vicinity of a wall, it can cause mechanical damage by causing micro-perforations in the metal (erosion).

The other pumps that are used in grey-water management systems are Venturi pumps. Unfortunately, such pumps that use the Venturi effect require another type of pump to be used to generate the drive pressure, thereby increasing the overall weight. In addition, such pumps have very low energy efficiency, of in the range 10% to 25%, and are sensitive to the phenomenon of cavitation.

Phenomenon of cavitation are highly detrimental for equipment that is "sensitive" to such phenomenon because they generate mechanical damage to the equipment, degradation in the efficiency, noise, and, in certain circumstances, introduction of gas bubbles, which can be problematic for the equipment.

There therefore exists a genuine need for a grey-water management system that offers good energy efficiency, compactness, and low weight, that requires only low maintenance, and that is insensitive to the phenomenon of cavitation that can appear as a function of flight conditions, in particular.

In addition, it also appears that the pumps used in prior art grey-water management systems are more sensitive to pollution in the grey water. In the application in question, relating in particular to managing grey water in an aircraft, such prior art pumps suffer from problems of blocking or clogging when the grey water to be pumped is too dirty or contains too many foreign bodies and/or too much organic matter. Such pumps are too sensitive to the size of the waste or foreign bodies present in the grey water to be pumped.

BRIEF SUMMARY

An object the invention is thus to remedy those drawbacks by proposing a method of removing the wastewater contained in a water retention tank of a grey-water management system for an aircraft toilet, which method requires low maintenance, and is sensitive neither to the phenomenon of cavitation, nor to the quantity or size of the waste or foreign bodies potentially present in said grey water.

In order to solve the above-mentioned problems, a method has been developed for removing wastewater contained in a water retention tank of grey-water management system for an aircraft toilet, said method being remarkable in that it consists in removing the wastewater via a diaphragm pump having an undulating diaphragm, which pump includes an inlet pipe connected to said retention tank, the diaphragm of the pump being suitable for undulating, under the action of actuation means, so as to remove said wastewater present in the retention tank through the inlet pipe of the pump to an outlet pipe of the pump.

Similarly, an object of the invention is to provide a grey-water management system that also requires low maintenance, and is not sensitive to the phenomenon of cavitation either.

Another object of the invention is to provide a grey-water management system that is not sensitive to the quantity or size of the waste or foreign bodies potentially present in said grey water.

To this end, a grey-water management system has been developed for an aircraft toilet, said system comprising a washbasin, a water supply faucet for supplying water to said washbasin, a drain for draining the wastewater from the washbasin, which drain is connected to a retention tank provided with a filter, a bowl connected to the retention tank, and a main tank for the wastewater. The bowl and the retention tank are connected to said main tank via pipes.

In accordance with the invention, the grey-water management system includes a diaphragm pump having an undulating diaphragm, which pump includes an inlet pipe connected to the retention tank and an outlet pipe connected to the bowl. The diaphragm of the pump is suitable for undulating, under the action of actuation means, so as to remove said wastewater present in the retention tank through the inlet pipe of the pump to the outlet pipe of the pump, so as to supply wastewater to the bowl.

Compared with prior art grey-water management systems, low maintenance is obtained due to the absence of rotary parts in the diaphragm pump, and due to high tolerance to cavitation phenomena and to pollution. In addition, implementing the grey-water management system is facilitated because the diaphragm pump enables the pump to be self-priming.

In a particular embodiment, the actuation means for actuating the diaphragm pump consist of an electromagnetic linear actuator and of damper means that delimit the stroke of the electromagnetic actuator.

Preferably, the pump has a cylindrical body delimiting a cylindrical chamber into which the inlet pipe opens out and from which the outlet pipe leads off with its axis coinciding with the axis of the cylindrical body. The undulating diaphragm is provided with a central opening extending in register with the outlet pipe.

Thus, in several variant embodiments, the inlet pipe of the diaphragm pump extends either radially relative to the pump body, or on the side opposite from the outlet pipe and with its axis coinciding with the axis of the outlet pipe.

In addition, the inlet pipe of the diaphragm pump may be in the form of a plurality of vents provided in the cylindrical body of the pump so as to put the cylindrical chamber into communication with the outside of the pump.

In unessential manner, the inlet pipe and/or the outlet pipe of the diaphragm pump may have at least one filter.

Advantageously, the diaphragm pump of the management system of the invention includes at least one sensor, such as a pressure sensor and/or a temperature sensor and/or a grey-water presence sensor.

BRIEF DESCRIPTION OF THE SEVERAL VIEWS OF THE DRAWINGS

Other advantages and characteristics will appear more clearly from the following description of variant embodiments the pump and of the grey-water management system of the invention that are given by way of non-limiting example, and with reference to the accompanying drawings, in which.

DETAILED DESCRIPTION

Figure 1:
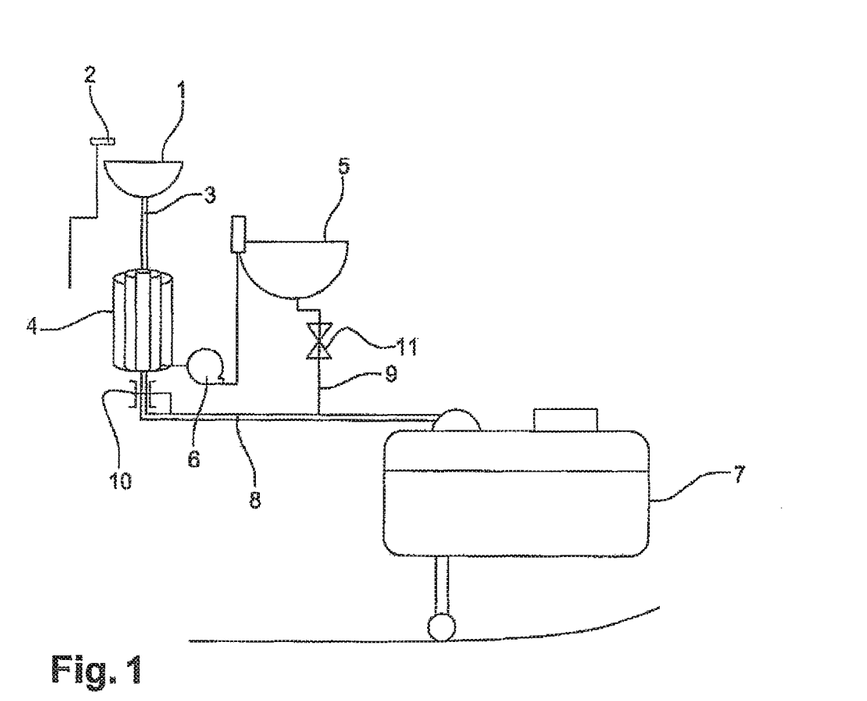
FIG. 1 is a diagrammatic view of the grey-water management system of the invention.

With reference to FIG. 1, the grey-water management system of an aircraft includes a washbasin (1), a water supply tap or faucet (2) for supplying water to said washbasin (1), a drain (3) for draining the wastewater from the basin (1), which drain is connected to a retention tank (4) provided with a filter, and a bowl or pan (5) connected to the retention tank (4). The system also includes a main wastewater tank (7), and the bowl (5) and the retention tank (4) are connected to said main tank (7) via pipes (8, 9) that are respectively equipped with a valve (10) and with a solenoid valve (11).

In accordance with the invention, the system includes a diaphragm pump (6) having an undulating diaphragm, which pump includes an inlet pipe (14) connected to the retention tank (4), and an outlet pipe (15) connected to the bowl (5). The diaphragm of the pump (6) is suitable for undulating, under the action of actuation means (16), so as to remove said wastewater present in the retention tank (4) through the inlet pipe (14) of the pump (6) to the outlet pipe (15) of the pump (6), so as to supply wastewater to the bowl (5), in particular wastewater coming from the washbasin.

Figure 2:
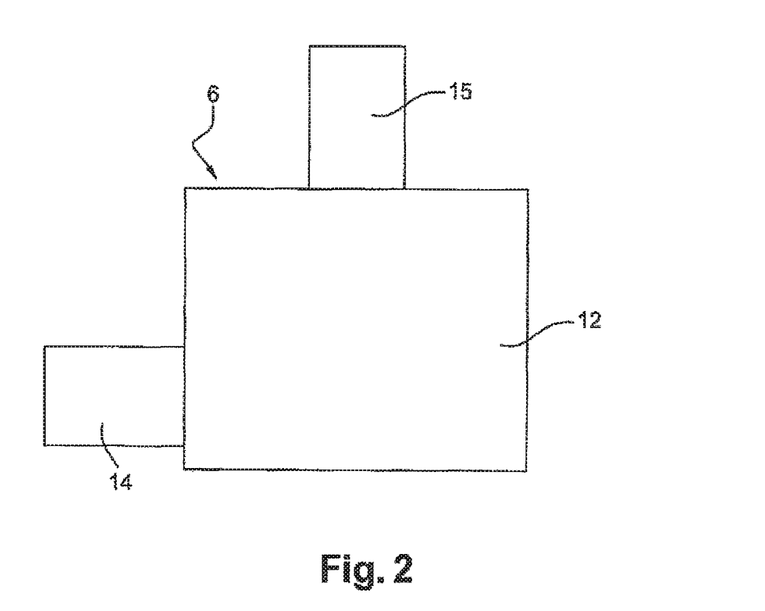
FIG. 2 is a side view of a first variant embodiment of the pump of the grey-water management system of the invention.
Figure 3:
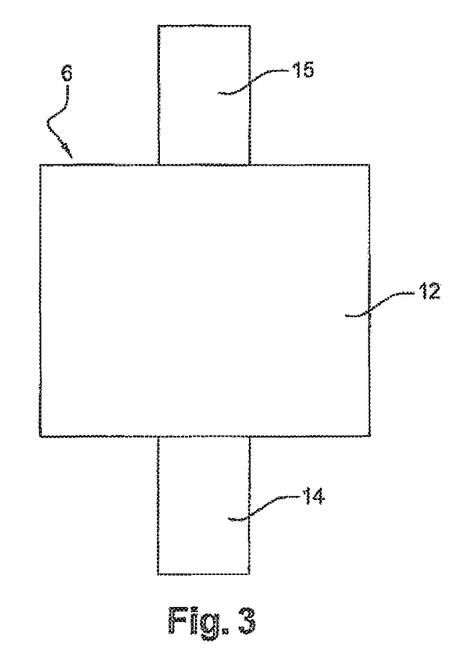
FIG. 3 is a side view of a second variant embodiment of the pump of the grey-water management system of the invention.
Figure 4:
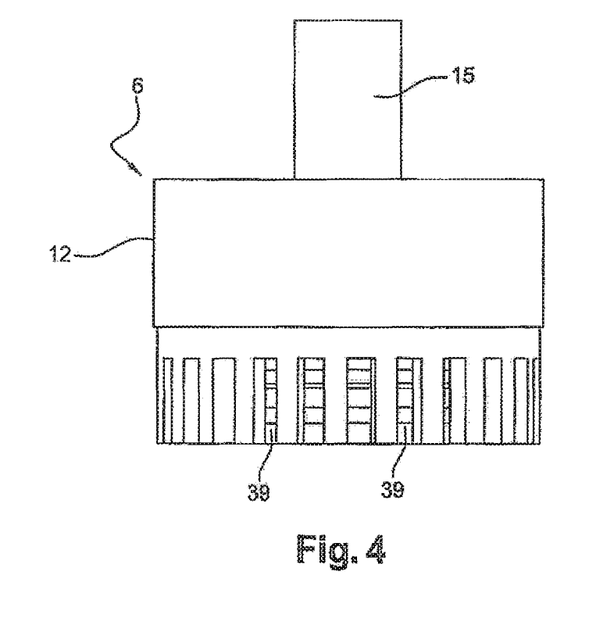
FIG. 4 is a side view of a third variant embodiment of the pump of the grey-water management system of the invention.

In three variant embodiments of the pump of the grey-water management system of the invention, and with reference to FIGS. 2 to 4, the diaphragm pump (6) of the wastewater management system includes a cylindrical pump body (12) defining a cylindrical chamber into which an inlet pipe (14) opens out and from which an outlet pipe (15) leads off with the axis of the outlet pipe coinciding with the axis of the pump body (12), and an undulating diaphragm provided with a central opening and extending inside the cylindrical chamber between a stationary lower cheek plate and a stationary upper cheek plate, said cheek plates extending inside the cylindrical chamber.

The undulating diaphragm is disk-shaped and is provided with a circular central opening. The undulating diaphragm is made of a deformable material such as, for example, a silicone elastomer or the like. The thickness of the undulating diaphragm increases going from its central portion towards its peripheral portion, and the circular central opening has a diameter that is substantially equal to the inside diameter of the outlet pipe (15).

The lower cheek plate is secured to the bottom of the body (12) of the pump (6) and the upper cheek plate is suitable for being moved vertically in order to cause the cubic capacity of the pump to vary, as described in detail below. In addition, the walls of the lower and upper cheek plates that face the diaphragm are convex.

The pump (6) further includes rigid support means for rigidly supporting the diaphragm between the lower and upper cheek plates. Said support means co-operate, in particular, with the peripheral edge of the diaphragm. For example, said support means consist of an annular band carrying the peripheral edge of the diaphragm.

The pump (6) further includes actuation means for actuating the undulating diaphragm that co-operate with the support means for supporting said diaphragm. For example, said actuation means consist of an electromagnetic linear actuator and of damper means that delimit the stroke of the electromagnetic actuator.

The electromagnetic actuator consists of a moving cylindrical ring extending about the same axis as the outlet pipe (15) above the upper cheek plate and in register with an excitation motor. The excitation motor is made up of an "inner" stationary cylindrical strength member and of an "outer" stationary cylindrical strength member carrying an annular coil and two annular permanent magnets extending respectively above and below the annular coil, said annular coil being connected to a power supply circuit. For example, the power supply circuit includes at least one power amplifier and a signal generator.

The lower end of the moving cylindrical ring is secured to an annular band provided with a shoulder, and in engagement with a link part that is secured to the support band for supporting the undulating diaphragm. Thus, the link part holds the undulating diaphragm, in particular when the actuator is at rest.

In addition, advantageously, the upper cheek plate is secured to a slide suitable for sliding vertically relative to the inner stationary strength member in order to cause the cubic capacity of said pump (6) to vary. For example, said slide consists of a circular part provided with a central passage through which the outlet pipe (15) can pass, and with holes through which the guides secured to the inner stationary strength member extend. In order to cause the position of said slide to vary, said slide is provided with tapping co-operating with a screw extending through a hole provided in the inner stationary strength member. The screw consists of a tubular part of circular cross-section and provided with a thread on its outside wall, in its lower portion.

The upper cheek plate is secured to the bottom face of said slide so that, by causing the position of said slide to vary along the vertical axis of revolution of the pump (6), it is possible to cause the cubic capacity of the pump to vary as a function of the needs of the application for which it is to be used.

In unessential manner, the inlet pipe (14) and/or the outlet pipe (15) may have at least one filter.

In addition, the pump of the invention may advantageously include at least one sensor, such as a pressure sensor and/or a temperature sensor and/or a wastewater presence sensor. The information measured by these sensors may be transmitted to the power supply circuit that may include management means for regulating the flow rate as a function of said information by changing the power supply characteristics of the electromagnetic linear actuator, in particular.

Thus, when the electromagnetic linear actuator is activated, the moving cylindrical ring is moved downwards and upwards in alternation, driving the undulating diaphragm downwards and upwards respectively, at the frequency powering the electromagnetic linear actuator. In this way, the diaphragm propagates a wavefront that causes the wastewater present in the cylindrical chamber to move towards the outlet pipe (15).

Several variant embodiments are possible for the arrangement of the inlet pipe (14) relative to the pump body (12). In a first variant shown in FIG. 2, the inlet pipe (14) of the diaphragm pump (6) extends radially relative to the pump body (6).

In a second variant shown in FIG. 3, the inlet pipe (14) extends on the side opposite from the outlet pipe (15), and with its axis coinciding with the axis of said outlet pipe (15).

Finally, in a third variant shown in FIG. 4, the inlet pipe (14) of the diaphragm pump (6) is in the form of a plurality of vents (39) provided in the cylindrical body (12) of the pump (6) so as to put the cylindrical chamber into communication with the outside of the pump (6). In this particular embodiment, said vents (39) consist of longitudinal slots that are uniformly distributed over the circumference of the cylindrical pump body (12) and that extend over the entire height of the cylindrical chamber.

Figure 5:
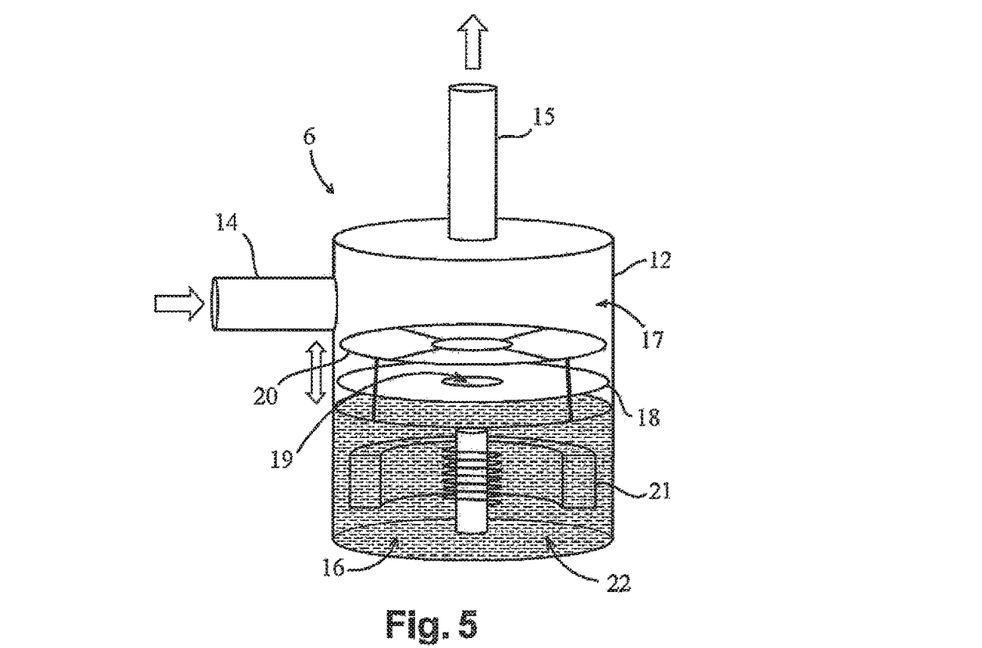
FIG. 5 is a diagrammatic view showing, from the side, the inside of a fourth variant embodiment of the pump of the grey-water management system of the invention.

With reference to FIG. 5, showing a fourth variant embodiment of the diaphragm pump (6) of the wastewater management system, said pump, in the same way as before, includes a cylindrical pump body (12) delimiting a cylindrical chamber (17) into which a radial inlet pipe (14) opens out and from which an outlet pipe (15) leads off that has its axis coinciding with the axis of the pump body (12). An undulating diaphragm (18) is arranged inside the cylindrical chamber (17), and is in the form of a disk provided with a circular central opening (19) having a diameter substantially equal to the inside diameter of the outlet pipe (15). The undulating diaphragm (18) is secured to a moving structure (20) connected to a moving magnet (21) of an electromagnet (22). Thus, when the electromagnet (22) is fed with electric current, the moving magnet (20) oscillates and causes the moving structure (21) and thus the undulating diaphragm (18) to oscillate. The oscillation of the undulating diaphragm (18) makes it possible to generate a wavefront causing the flow of wastewater to flow through the pump (6). The moving structure, also in the form of a disk, also makes it possible to protect the undulating diaphragm (18).

Figure 6:
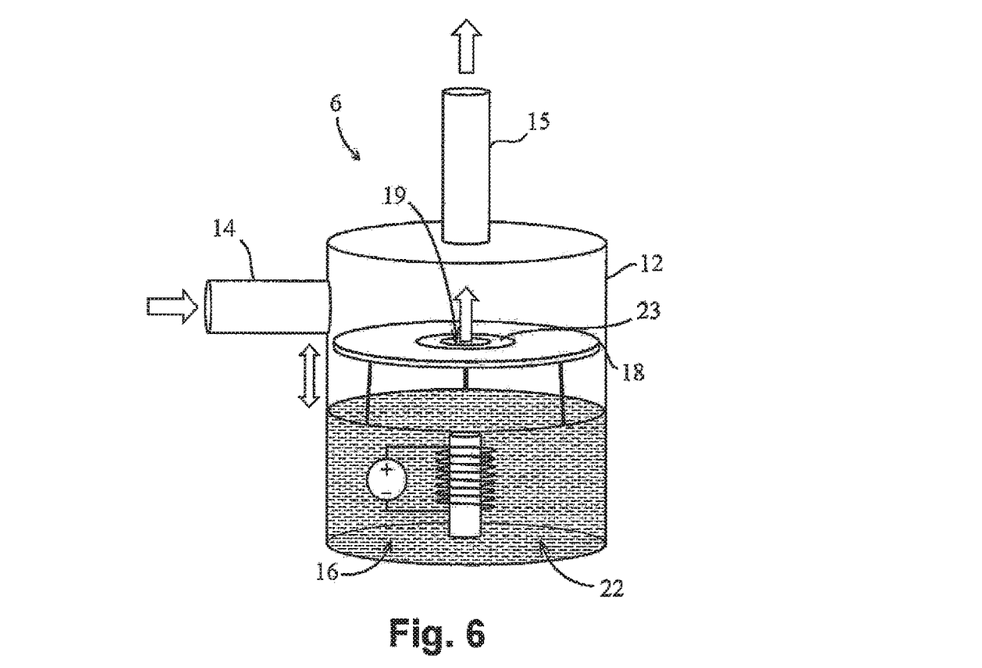
FIG. 6 is a diagrammatic view showing, from the side, the inside of a fifth variant embodiment of the pump of the grey-water management system of the invention.

In a fifth variant embodiment of the diaphragm pump (6) shown in FIG. 6, said diaphragm pump includes, in the same manner as above, a cylindrical pump body (12) delimiting a cylindrical chamber (17) in which a radial inlet pipe (14) opens out and from which an outlet pipe (15) leads off that has its axis coinciding with the pump body (12). An undulating diaphragm (18) is arranged inside the cylindrical chamber (17), and is in the form of a disk provided with a circular central opening (19) having a diameter substantially equal to the inside diameter of the outlet pipe (15).

The undulating diaphragm is secured to an electromagnet (22) that, when it is activated by an electrical source, changes its polarization to attract and repel a magnetic disk (23) arranged at the center of the undulating diaphragm (18), around the circular opening (19). The movement of the undulating diaphragm (18) causes the wastewater to flow through the pump (6).

Figure 7:
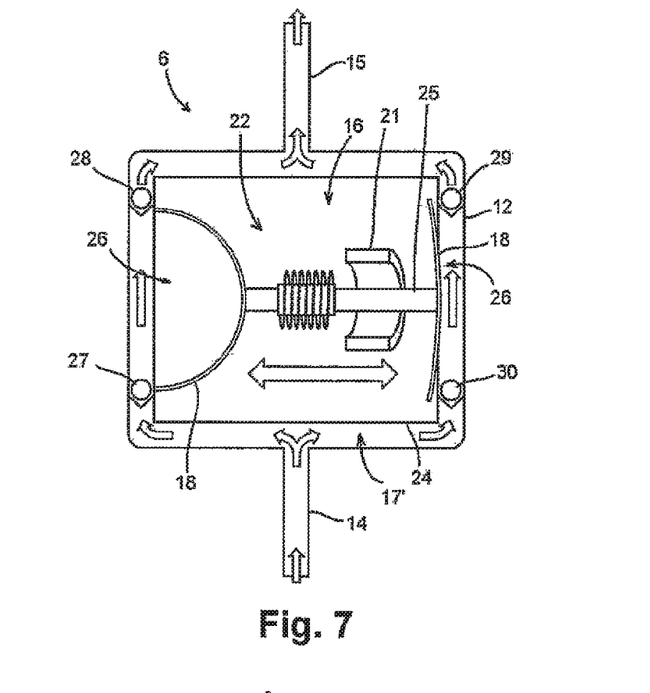
FIG. 7 is a diagrammatic view showing, from the side, the inside of a sixth variant embodiment of the pump of the grey-water management system of the invention.

In a sixth variant embodiment of the diaphragm pump (6) shown in FIG. 7, said diaphragm pump includes a cylindrical pump body (12) inside which a second cylindrical body (24) is arranged in such a manner as to delimit, between the two cylindrical bodies (12, 24), an annular chamber (17') into which a radial inlet pipe (14) opens out that has its axis coinciding with the axis of the pump body (12), and from which an outlet pipe (15) leads off that also has its axis coinciding with the axis of the pump body (12).

The second cylindrical body (24) includes an electromagnet (22) that has a pin (25) arranged perpendicularly to the inlet pipe (14) and to the outlet pipe (15) and secured to a moving magnet (21). Thus, when the electromagnet (22) is fed with electric current, the moving magnet (21) oscillates and causes the pin (25) to oscillate. Each end of the pin (25) has an undulating diaphragm (18) mounted on it, in communication with the annular chamber (17'), so as to close off an opening (26) in the second cylindrical body (24).

The annular chamber (17') is provided with check valves, i.e., non-return valves (27, 28, 29, 30) arranged on either side of each of the openings (26) provided in the second cylindrical body (24). The check valves (27, 28, 29, 30) allow wastewater coming from the inlet pipe (14) to flow through to the outlet pipe (15) or prevent it from flowing through to said outlet pipe (15). The diaphragm pump (6) thus has four check valves, all positioned in the same operating direction.

Thus, when the electromagnet (22) is activated by an electrical source, the pin (25) oscillates or reciprocates laterally and causes the wastewater to be pumped through the pump (6). Said check valves (27, 28, 29, 30) are positioned such that when the pin (25) moves laterally rightwards, the undulating diaphragm (18) arranged at the right end of the pin (25) pushes the volume of wastewater present in the annular chamber (17') between the two corresponding valves (29, 30), and causes the check valve (29) in communication with the outlet pipe (15) to open, and the check valve (30) in communication with the inlet pipe (14) to close. The volume of wastewater present between the two valves (29, 30) is thus removed via the outlet pipe (15).

In parallel, the rightward lateral movement of the pin (25) causes the undulating diaphragm (18) arranged at the left end of the pin (25) to move. Said undulating diaphragm (18) generates a suction phenomenon causing the valve (28) in communication with the outlet pipe (15) to close, and causing the valve (27) in communication with the inlet pipe (14) to open. This suction makes it possible to fill with wastewater the volume present in the annular chamber (17') between the two corresponding valves (27, 28). That filled volume is emptied via the outlet pipe (15) when the pin (25) is moved laterally leftwards, and so on. The wastewater flows continuously in alternation.

Figure 8:
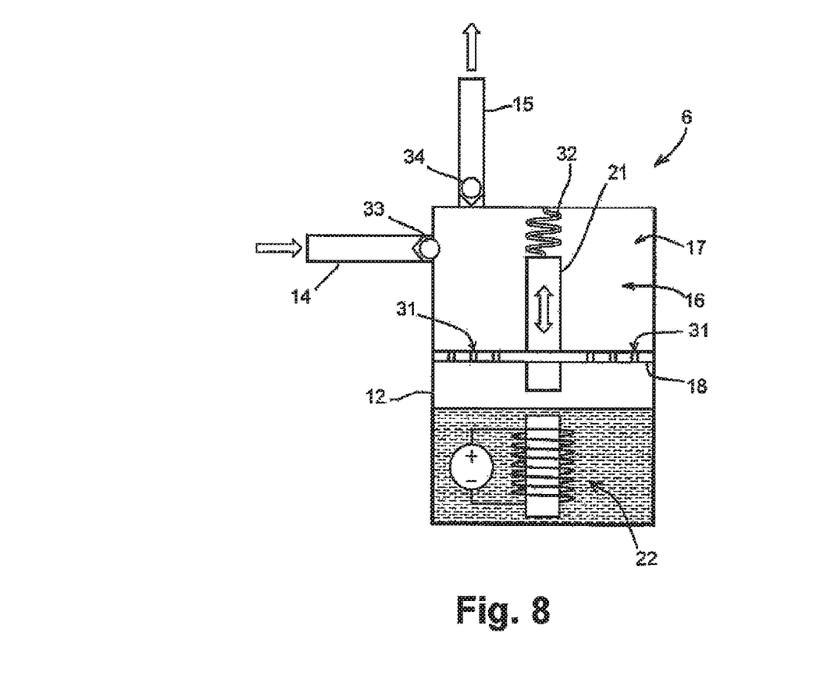
FIG. 8 is a diagrammatic view showing, from the side, the inside of a seventh variant embodiment of the pump of the grey-water management system of the invention.

In a seventh variant embodiment of the diaphragm pump (6) shown in FIG. 8, said diaphragm pump includes a cylindrical pump body (12) delimiting a cylindrical chamber (17) into which a radial inlet pipe (14) opens out and from which an outlet pipe (15) leads off that has its axis coinciding with the axis of the pump body (12), and an undulating diaphragm (18) in the form of a disk provided with a plurality of orifices (31). The undulating diaphragm (18) extends inside the cylindrical chamber (17).

The undulating diaphragm (18) is secured to a permanent magnet (21). An electromagnet (22) is arranged inside the cylindrical chamber (17) and, when it is activated by an electrical source, it changes its polarization to attract and to repel the permanent magnet (21) mounted on a spring (32). The oscillation movement of the permanent magnet (21) causes the undulating diaphragm (18) to oscillate or to undulate, and causes the wastewater to be pumped through the pump (6).

The inlet pipe (14) and the outlet pipe (15) are provided with check valves (33, 34) arranged in the same operating direction so that, when the undulating diaphragm (18) pushes the volume of wastewater towards the outlet pipe (15), the check valve (34) of the outlet pipe (15) opens to allow said volume out, and the check valve (33) of the inlet pipe (14) closes. Conversely, when the undulating diaphragm (18) oscillates in the other direction, the inlet valve (14) is opened and a volume of wastewater is sucked into the cylindrical chamber (17), and the check valve (34) of the outlet pipe (15) is closed.

To sum up, the wastewater management system incorporates a positive-displacement diaphragm pump (6) that uses the diaphragm in alternating or reciprocating motion, in which the grey water is moved by trapping a fixed quantity of grey water, and by forcing the trapped volume to be discharged via the outlet pipe (15).

The diaphragm pump (6) thus has good suction properties and can pump relatively dirty water with a relatively large quantity of particles and of solid contents, which can even be as large as small articles that might fall into the washbasin (1) and be carried by the water, such as, for example, a piece of paper or a metal ring.

The only moving part with which the grey water is in contact in the pump is the elastomer diaphragm. All of the mechanical and electrical components are isolated from exposure to grey water. This makes it possible to minimize the risk of trapping foreign bodies and to maximize the reliability of the wastewater management system of the invention.

Figure 9:
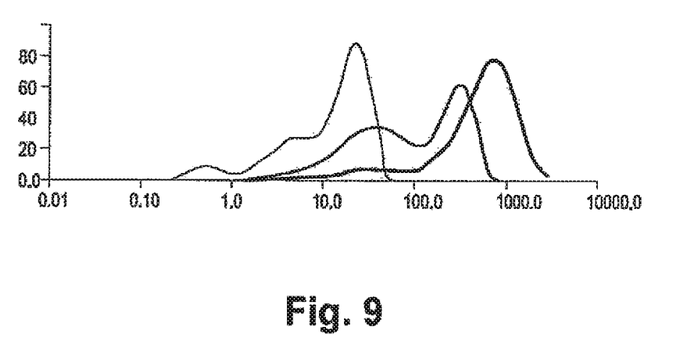
FIG. 9 is a graph of the particle size distribution in the grey water driven by the pump of the grey-water management system of the invention.

The wastewater management system of the invention is thus not sensitive to the quantity and to the size of the waste or foreign bodies potentially present in the grey water, as shown in FIG. 9, which is a graph of the particle size distribution of the particles in the grey water driven by the pump of the grey-water management system of the invention.

Naturally, the shape of the pump is not limiting on the invention, it being possible for the chamber and the diaphragm to have any shape whatsoever, such as a rectangular block shape for the pump body (12) and the chamber, and a rectangular shape for the diaphragm, without going beyond the ambit of the invention. What is essential is for a diaphragm pump to be advantageously used in managing waste water for use by a toilet of an aircraft.

Finally, naturally the above-given examples are merely particular illustrations and in no way limit the field of application of the invention.

The various embodiments described above can be combined to provide further embodiments. Aspects of the embodiments can be modified, if necessary to employ concepts of the various patents, applications and publications to provide yet further embodiments.

These and other changes can be made to the embodiments in light of the above-detailed description. In general, in the following claims, the terms used should not be construed to limit the claims to the specific embodiments disclosed in the specification and the claims, but should be construed to include all possible embodiments along with the full scope of equivalents to which such claims are entitled. Accordingly, the claims are not limited by the disclosure.

The invention claimed is:

1. A method of removing wastewater contained in a water retention tank of grey-water management system for an aircraft toilet, comprising:
    removing the wastewater via a diaphragm pump having an undulating diaphragm,
    the diaphragm pump comprising an inlet pipe connected to the retention tank, the diaphragm of the pump actuated by electromagnetic or magnetic actuation so as to remove wastewater present in the retention tank through the inlet pipe of the pump to an outlet pipe of the pump.

2. A grey-water management system for an aircraft toilet, the system comprising a washbasin, a water supply faucet for supplying water to said washbasin, a drain for draining the wastewater from the washbasin, which drain is connected to a retention tank provided with a filter, a bowl connected to the retention tank, and a main tank for the wastewater, the bowl and the retention tank being connected to said main tank via pipes, wherein the system comprises a diaphragm pump having an undulating diaphragm, the diaphragm pump comprising an inlet pipe connected to the retention tank, and an outlet pipe connected to the bowl, the diaphragm of the pump actuated by electromagnetic or magnetic actuation so as to remove wastewater present in the retention tank through the inlet pipe of the pump to the outlet pipe of the pump so as to supply wastewater to the bowl.

3. The grey-water management system according to claim 2, wherein the electromagnetic or magnetic actuation is done by an electromagnetic linear actuator and a damper means that delimit the stroke of the electromagnetic linear actuator.

4. The grey-water management system according to claim 2, wherein the pump has a cylindrical body delimiting a cylindrical chamber into which the inlet pipe opens out and from which the outlet pipe leads off with an axis of the outlet pipe coinciding with an axis of the cylindrical body, the undulating diaphragm comprising a central opening capable of registering with the outlet pipe.

5. The grey-water management system according to claim 4, wherein the inlet pipe of the diaphragm pump extends radially relative to the pump body.

6. The grey-water management system according to claim 4, wherein the inlet pipe of the diaphragm pump extends on the side opposite from the outlet pipe and with an axis of the inlet pipe coinciding with the axis of the outlet pipe.

7. The grey-water management system according to claim 4, wherein the inlet pipe of the diaphragm pump comprises a plurality of vents in the cylindrical pump body so as to put the cylindrical chamber into communication with the outside of the pump.

8. The grey-water management system according to claim 2, wherein the inlet pipe or the outlet pipe or both are provided with at least one filter.

9. The grey-water management system according to claim 2, wherein the diaphragm pump comprises at least one sensor.

10. The grey-water management system according to claim 9, wherein the at least one sensor comprises a pressure sensor, a temperature sensor, a grey water presence sensor, or any combination thereof.

11. The grey-water management system according to claim 2, wherein the electromagnetic or magnetic actuation comprises movement of a magnetic disk.

12. The grey-water management system according to claim 11, movement of the magnetic disk is along a pin perpendicular to the inlet pipe.

13. The grey-water management system according to claim 2, wherein the electromagnetic or magnetic actuation comprises a permanent magnet secured to the undulating diaphragm.

14. The grey-water management system according to claim 2, wherein the diaphragm comprises an elastomer diaphragm.

* * * * *